(No Model.)
W. SHIELDS.
MANUFACTURE OF BOLTS.
No. 367,166. Patented July 26, 1887.
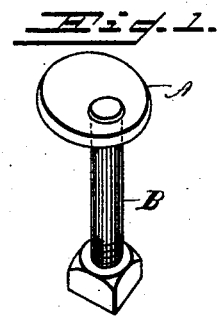
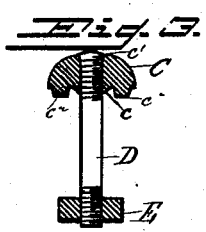
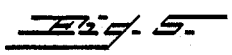
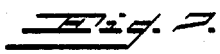
WITNESSES
Will. H. Powell.
Will. H. Graeff.
INVENTOR
William Shields,
By Connolly Bros.
Attorneys.
N. PETERS, Photo-Lithographer, Washington, D. C.

United States Patent Office.

WILLIAM SHIELDS, OF PHILADELPHIA, PENNSYLVANIA.

MANUFACTURE OF BOLTS.

SPECIFICATION forming part of Letters Patent No. 367,166, dated July 26, 1887.

Application filed October 1, 1886. Serial No. 215,097. (No model.)

*To all whom it may concern:*

Be it known that I, WILLIAM SHIELDS, a citizen of the United States, residing at Philadelphia, in the county of Philadelphia and State of Pennsylvania, have invented certain new and useful Improvements in the Manufacture of Bolts; and I do hereby declare the following to be a full, clear, and exact description of the invention, reference being had to the accompanying drawings, which form part of this specification, in which—

Figure 1 is a perspective of a spring-bolt. Fig. 2 is a perspective of the head of a pyramid head-bolt. Fig. 3 is a vertical section of a carriage-bolt. Fig. 4 is a plan of under side of head of a step-bolt. Fig. 5 is a plan of head of felly-bolt, inverted. Fig. 6 is a side elevation of head of T-bolt. Fig. 7 is a perspective of head of square-headed bolt.

In the manufacture of bolts the general practice has been to form the head and shank integral or in one piece. Sometimes the bolt has been made complete from a piece or bar of round iron, the head and square neck being "upset" or swaged, and in some cases the bolt has been made from square iron, the head being produced by upsetting or forging and the shank being forged round. Both these methods of construction, particularly that in which round iron is used and the head and neck upset, have been successful in the manufacture of ordinary carriage-bolts. But very considerable difficulty has always been encountered in the manufacture of bolts having specially-shaped heads—*i. e.*, heads different from the heads of ordinary carriage-bolts or step-bolts—and of spring-bolts in which the shank is eccentric to the head.

My invention has for its object to provide a construction or method of manufacture in which the difficulties of making bolts with special forms of heads and of producing spring-bolts will be overcome and the cost of production reduced.

A further object of my invention is to produce a construction of bolt in which the square neck heretofore generally employed will be done away with and other means for preventing the turning of the bolt provided.

My improvements consist, essentially, in making the head and shank of a bolt separately in the first instance, said parts being afterward united by screwing and riveting, as hereinafter explained.

My improvements further consist in the provision on the under side of a bolt-head of fins or points adapted and designed to enter the wood or iron against which the head is pressed and prevent the turning of the bolt.

My invention further consists in making the head of the bolt with a swell or projection on its under side to increase the thickness of the head and form a larger body for the threading, and in the provision of notches in said head to receive a portion of the metal of the shank upset in the riveting.

Referring to the accompanying drawings, A represents the head and B the shank of a spring-bolt, or bolt used in joining the ends of a carriage-spring. Said shank is eccentric to the head, and owing to such eccentricity it has always been difficult to make this kind of bolts by the usual methods, or when said head and shank were integral or in one piece.

In accordance with my invention I make the head and shank separately in the first instance, the head being a disk or washer, which may be cut from a plate, or otherwise produced, having an eccentrically-located opening which is threaded to receive the threaded end of the shank that is entered thereto. After screwing the shank into the head the outer or projecting end of the shank is riveted, thus preventing the head from becoming loose on said shank or the latter turning in the head.

C represents the head of an ordinary carriage-bolt, which head is formed with a central threaded opening to receive the threaded end of the shank D, the latter after insertion in the head being riveted. To increase the body of the metal about the screw-hole of the head, the latter is or may be formed with a swell or boss, $c$, and may have also notches $c'\,c'$ on the side of the screw-hole, which notches receive some of the metal upset by the riveting, thus increasing the security of the head on the shank. Said head is also provided with fins or points $c^2\,c^2$ on its under side, which are adapted and designed to enter the wood, against which said head presses when in place, thereby dispensing with the square shank usually formed on bolts and providing substitute means for preventing the turning of the bolt, the neck being round.

In bolts which unite metals, or in which the heads contact with metal, as in spring-bolts, the fins or points $c^2$ are unnecessary, and in bolts, such as that shown in Fig. 2, having a thick head the swell or boss $c$ is not required.

Figs. 2, 4, 5, 6, and 7 illustrate other forms of bolt-heads of special shapes to which my invention is applicable; but I desire it to be understood that the special shape of the head is not an essential, and that my invention is not limited thereto.

The threads on the shank and in the head of the bolt will be in the same direction as the threads on the opposite end of said shank, which receives the usual nut, E, so that in turning on said nut the tendency will be to tighten rather that loosen the shank in the head.

By my method of construction special shapes of heads may be readily produced by cutting the same complete from plates, or by shaping them in a drop-press, or in some cases they may be cast.

The heads and shanks are readily united and do not require to be heated for that purpose. The upsetting heretofore required, which involved heating, and where "olivers" were used, necessitating the employment of specially skilled labor, is dispensed with, as the shaping, threading, fitting, and riveting may be done with cold metal and by machinery requiring comparatively unskilled or boy attendance.

What I claim as my invention is as follows:

1. The improvement in the art of manufacturing bolts herein described, the same consisting in making the head and shank of the bolt in separate pieces and uniting them by screwing and riveting, substantially as set forth.

2. A bolt having its head and shank respectively made of separate pieces, the head having a threaded opening which receives the shank and the latter being riveted in said head, substantially as shown and described.

3. A bolt having a threaded opening in its head for the reception of the threaded end of the shank and a swell or boss around said opening, substantially as shown and described.

4. A bolt having a threaded opening in its head which receives the screw end of a shank, said opening having notches or recesses which receive a portion of the metal of the shank upset in riveting the latter, substantially as shown and described.

5. A bolt comprising a head and shank made of separate pieces, said head having a threaded opening and fins or points on its underside, and said shank having a screw end which is fitted in said threaded opening and is riveted therein, substantially as shown and described.

In testimony that I claim the foregoing I have hereunto set my hand this 27th day of September, 1886.

WILLIAM SHIELDS.

Witnesses:
 EDWARD E. PAXSON,
 WILL H. POWELL.